United States Patent [19]

Shinpo et al.

[11] Patent Number: 5,049,179
[45] Date of Patent: Sep. 17, 1991

[54] GLASS GOB CUTTING DEVICE HAVING A GUIDE WITH INDEPENDENT MOVEMENT

[75] Inventors: Toshio Shinpo, Fujisawa; Kuraji Kubo, Tokyo, both of Japan

[73] Assignee: Toyo Glass Co., Ltd., Tokyo, Japan

[21] Appl. No.: 576,803

[22] Filed: Sep. 4, 1990

[30] Foreign Application Priority Data

Sep. 22, 1989 [JP] Japan .................. 1-247228

[51] Int. Cl.$^5$ .................. C03B 7/12
[52] U.S. Cl. .................. 65/332; 65/334; 83/623; 83/163
[58] Field of Search .................. 65/332, 303, 304, 225, 65/127, 123, 133, 334; 83/623, 162, 163

[56] References Cited

U.S. PATENT DOCUMENTS

| | | | |
|---|---|---|---|
| 1,699,563 | 1/1929 | Cramer | 65/304 |
| 2,681,530 | 6/1954 | Peiler | 65/304 |
| 3,770,409 | 11/1973 | Colchagoff | 65/225 |
| 4,507,138 | 3/1985 | Kingsbury et al. | 65/304 |

FOREIGN PATENT DOCUMENTS 2123809 5/1983 United Kingdom .
2204034 4/1988 United Kingdom .

OTHER PUBLICATIONS

Patent Abstracts of Japan, unexamined applications 60-169110 and 60-16911, both filed Jul. 31, 1985.

Primary Examiner—Richard V. Fisher
Assistant Examiner—John M. Hoffmann
Attorney, Agent, or Firm—Sughrue, Mion, Zinn Macpeak & Seas

[57] ABSTRACT

A glass gob cutting device in a gob feeder for cutting a gob of molten glass supplied from an orifice of a furnace and supplying the cut gob of molten glass to a glass forming machine. The glass gob cutting device includes a pair of shearing blades for cutting a gob of molten glass to make the cut gob of molten glass, a pair of supporting arms for supporting the pair of shearing blades, a shearing mechanism connected to the supporting arms for actuating the supporting arms, a guide arm being actuated by actuating means different from the shearing mechanism and a guide provided on a free end of the guide arm for guiding the cut gob of molten glass and introducing the same into the glass forming machine.

9 Claims, 10 Drawing Sheets

GLASS GOB CUTTING DEVICE HAVING A GUIDE WITH INDEPENDENT MOVEMENT

BACKGROUND OF THE INVENTION

The present invention relates to a glass gob cutting device in a gob feeder, and more particularly to a glass gob cutting device which can cut a gob of molten glass and steadily feed the cut gob of molten glass to a glass forming machine.

Most glass articles are manufactured by a process in which raw materials are converted by a furnace to molten glass that is then fed to a glass forming machine and formed into the glass articles.

In general, a gob feeder used for feeding a gob of molten glass to a glass forming machine is known, for example, as disclosed in Japanese Laid Open Publication No. 62-30628. When the above gob feeder is used to mold glass articles, molten glass which has been molten in the furnace is continuously fed to the glass forming machine at regular time intervals. The molten glass fed by the gob feeder is cut by shearing blades which are fixed to tip ends of supporting arms.

Further, the conventional gob feeder is provided with a drop guide for guiding a gob of molten glass which has been cut. The drop guide is fixed to a tip end of a guide arm. The guide arm is connected to an intermediate portion of the supporting arm through a pin joint so that the guide arm is interlocked with the supporting arm. Thus, when the shearing arms are moved to actuate the shearing blades, the guide arm is also moved. Further, the shearing blade and the drop guide make a pair, that is, in a gob feeder having three or four gob supplying lines, there are three or four shearing blades and guides both which are positioned above the shearing arm and the guide arm, respectively. The number of searing blades and guides corresponds to the number of the gob supplying lines.

Currently, there is a tendency in the industry to increase the forming speed of the glass articles, particularly a gob feeder which has gob cutting ability of more than 150 cuts per minute has been manufactured. In this case, the tip end of the supporting arm to which the shearing blade is fixed, is actuated in a short time period of less than 0.4 seconds. The actuating speed of the supporting arm reaches its maximum speed of 2 m/s from its stationary state within 0.4 seconds. This actuation of the supporting arm is repeated twice per cutting cycle, which is frequently repeated.

In the conventional gob feeder, when the supporting arm is actuated at high speed, the guide arm connected to the supporting arm through the pin joint is actuated at high speed. Further, the shearing blade and the guide are fixed to the tip ends of the shearing arm and the guide arm respectively, therefore, both tip ends are heavy. In case of the gob feeder having three or four shearing blades and guides, the tip ends of the shearing arm and the guide arm are heavier due to the number of shearing blades and guides. If the heavy shearing arm and the heavy guide arm are actuated at high speed, the moment of inertia thereof is highly increased. As a result, the shearing arm and the guide arm are not actuated smoothly.

The supporting arm is actuated by a shearing mechanism, incorporating a plurality of gears, provided at a base portion of the supporting arm. If the supporting arm is actuated at high speed and the moment of inertia is highly increased, gears constituting the shearing mechanism wear away in a short time and backlash is formed between gear teeth. Therefore, the gob cannot be normally cut due to the backlash, thereby exerting a bad influence on strength and quality of the glass articles. That is, a shearing mark which is a big cut mark is formed, resulting in inefficient manufacturing process.

Further, if the supporting arm is actuated at high speed, the moment of inertia will be highly increased, and the guide arm for supporting the guide may be damaged or subject to elastic deformation before gears of the shearing mechanism wear away. If the guide arm is damaged, it must be replaced with a new one. If the guide arm is subject to elastic deformation, the guide may be displaced from the regular position for guide. Consequently, when cutting the glass gob, the glass gob cannot be steadily supplied to the glass forming machine.

SUMMARY OF THE INVENTION

It is an object of the present invention to provide a glass gob cutting device in a gob feeder which can cut a gob of molten glass and steadily feed the cut gob of molten glass to a glass forming machine when cutting the gob, even if the supporting arm is actuated at high speed.

The objects of the present invention are fulfilled by providing a glass gob cutting device in a gob feeder for cutting a gob of molten glass supplied from an orifice of a forehearth and supplying the cut gob of molten glass to a glass forming machine, the glass gob cutting device comprising: a pair of shearing blades for cutting a gob of molten glass to make the cut gob of molten glass; a pair of supporting arms for supporting the pair of shearing blades; a shearing mechanism for actuating the supporting arms, the shearing mechanism being connected to one end portion of the supporting arm; a guide arm provided adjacent to the shearing mechanism, the guide arm being actuated by actuating means different from the shearing mechanism; and guide means, provided on a free end of the guide arm, for guiding the cut gob of molten glass and introducing the same into the glass forming machine.

With the above structure, there is provided the guide arm which is actuated independently of actuation of the shearing mechanism, and the guide is provided on a free end of the guide arm to guide the cut gob of molten glass. Therefore, when the supporting arm is actuated, the guide arm is not actuated in conjunction with actuation of the supporting arm. Accordingly, even if actuating speed of the supporting arm is high, the moment of inertia is not increased and the supporting arm is smoothly actuated. Further, the guide arm remains in a stationary position during operation of the supporting arm, the guide provided at a tip end of the guide arm is not displaced and remains at a regular position. Therefore, after cutting a gob of molten glass, the cut gob of molten glass is stably supplied to the glass forming machine.

The above and other objects, features and advantages of the present invention will become apparent from the following description when taken in conjunction with the accompanying drawings in which preferred embodiments of the present invention are shown by way of illustrative examples.

DETAILED DESCRIPTION OF THE PREFERRED EMBODIMENTS

A glass gob cutting device in a gob feeder according to an embodiment of the present invention will be described below with reference to FIGS. 1 through 11.

Figure 1:
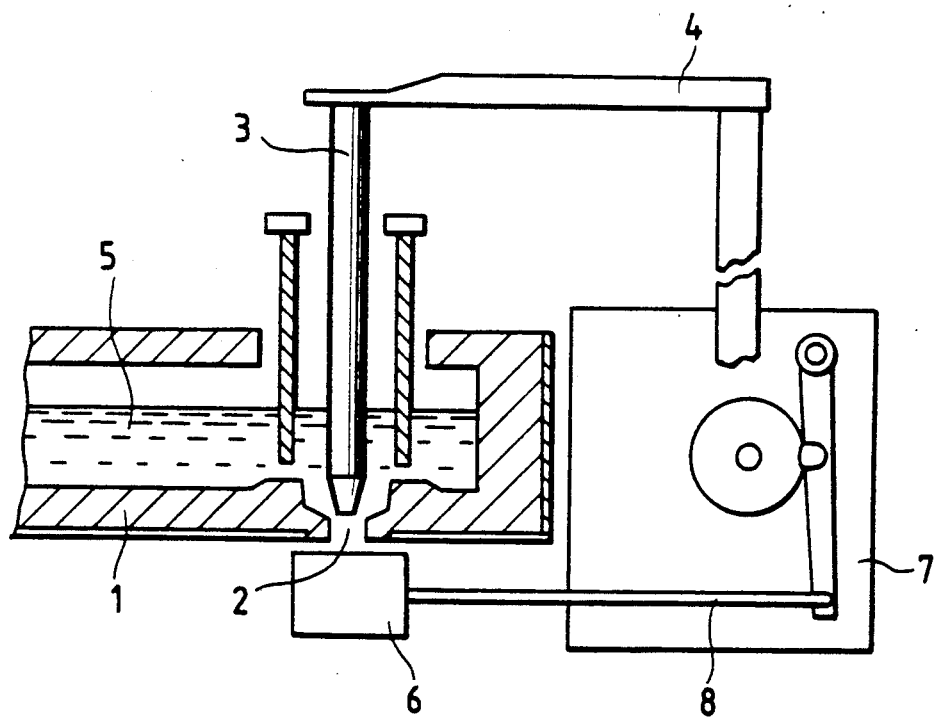
FIG. 1 is a schematic cross sectional view of a glass cutting device in a gob feeder according to an embodiment of the present invention.

FIG. 1 is a schematic cross sectional view of a gob feeder. In FIG. 1, a forehearth 1 is connected to a furnace (not shown), molten glass in the furnace is supplied to the forehearth 1. The forehearth 1 is provided with refractory lining made of refractory material. Molten glass in the range of about 1100° C. to about 1200° C. is accommodated in the forehearth 1. An orifice 2 is attached at a bottom of the forehearth 1. Above the orifice 2, there is provided a plunger 3 for controlling flow rate of molten glass passing through the orifice 2. The plunger 3 is moved up and down by an actuating mechanism 4. The plunger 3 is vertically actuated at even gob cut, molten glass is extruded by the plunger 3. Molten glass 5 passes through the orifice 2 and flows out from the forehearth 1, and then is cut by a glass gob cutting mechanism 6 provided immediately below the orifice 2. The glass gob cutting mechanism 6 is connected to a crank driving mechanism 7 through a connecting rod 8, and it is driven by a crank driving mechanism 7.

Figure 2:
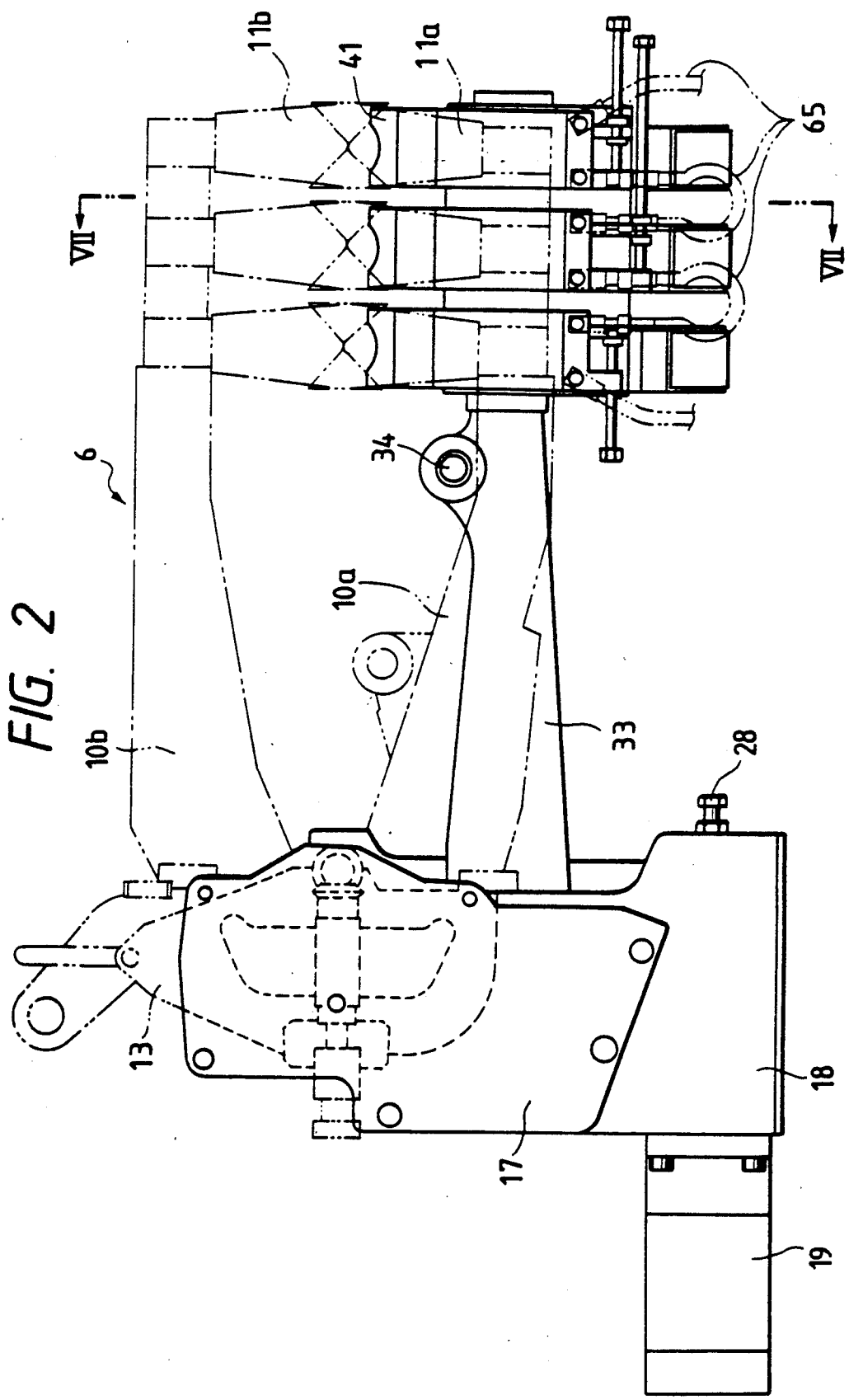
FIG. 2 is a plan view of the glass cutting device in a gob feeder according to the embodiment of the present invention.
Figure 4:
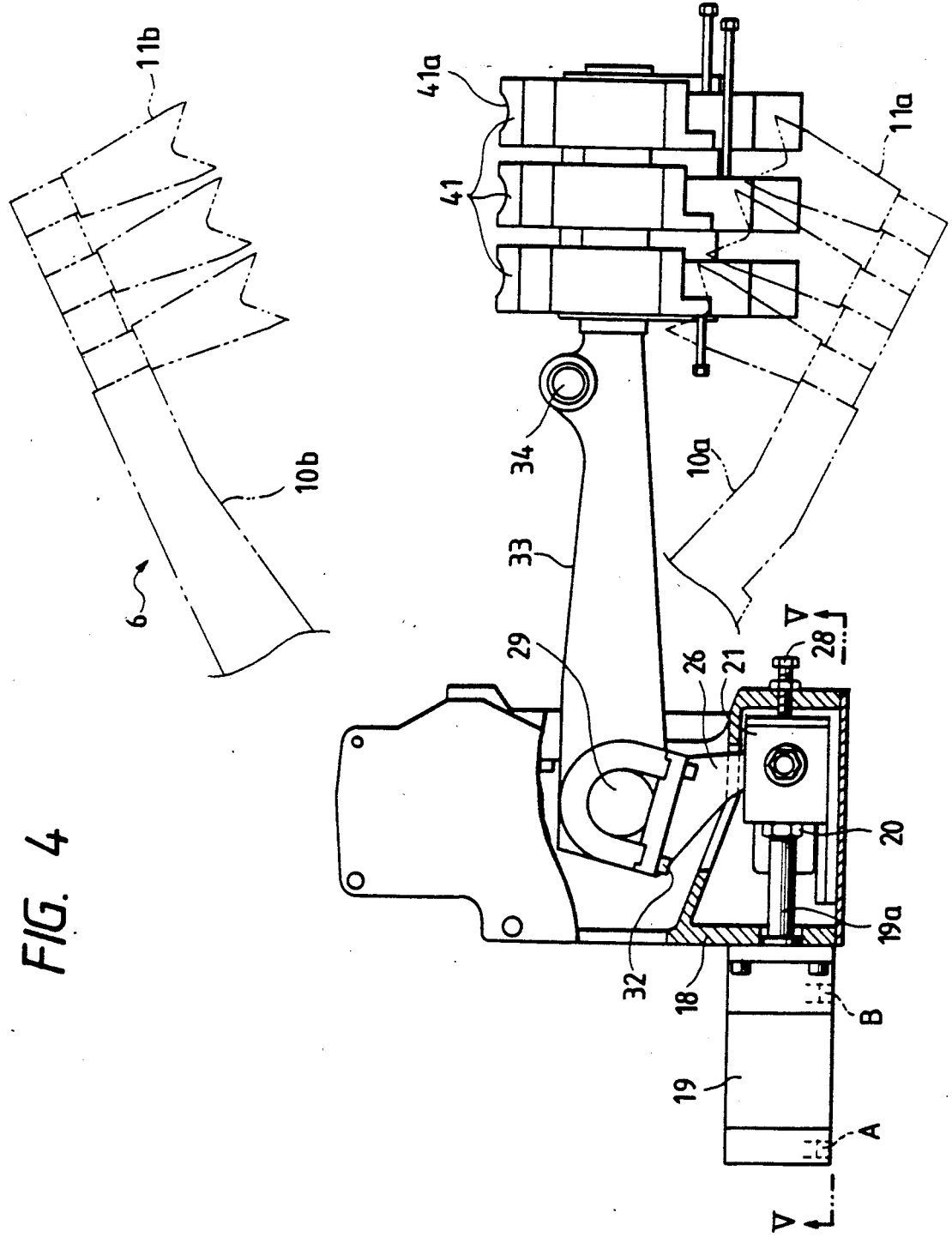
FIG. 4 is a side view of the glass cutting device in a gob feeder according to the embodiment of the present invention.

The glass gob cutting mechanism 6 is provided with a pair of supporting arms 10a, 10b having free ends to which three lines of shearing blades 11a, 11b are connected, respectively as shown in FIGS. 2 and 4. The supporting arms 10a, 10b have base portions which are connected to the shearing mechanism 13. The shearing mechanism 13 is connected to the crank driving mechanism 7 through the connecting rod 8 (see FIG. 1). The driving force of the crank driving mechanism 7 is transmitted to the shearing mechanism 13 through the connecting rod 8. The shearing mechanism 13 enables the supporting arms 10a, 10b to rotate about their base portions, thereby allowing their tip ends to swing to and from each other as shown in FIG. 4.

Figure 3:
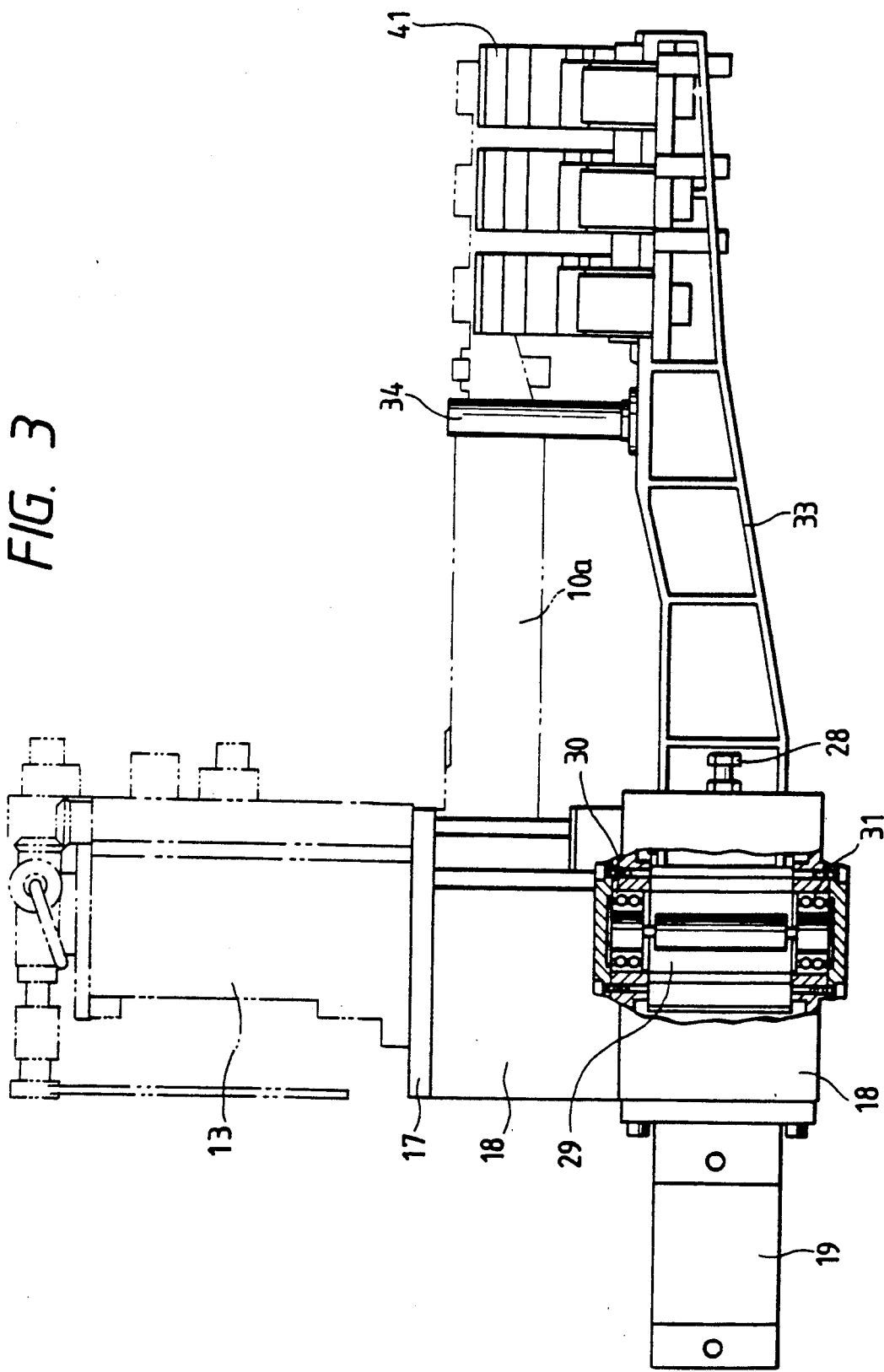
FIG. 3 is a side view of the glass cutting device in a gob feeder according to the embodiment of the present invention.
Figure 5:
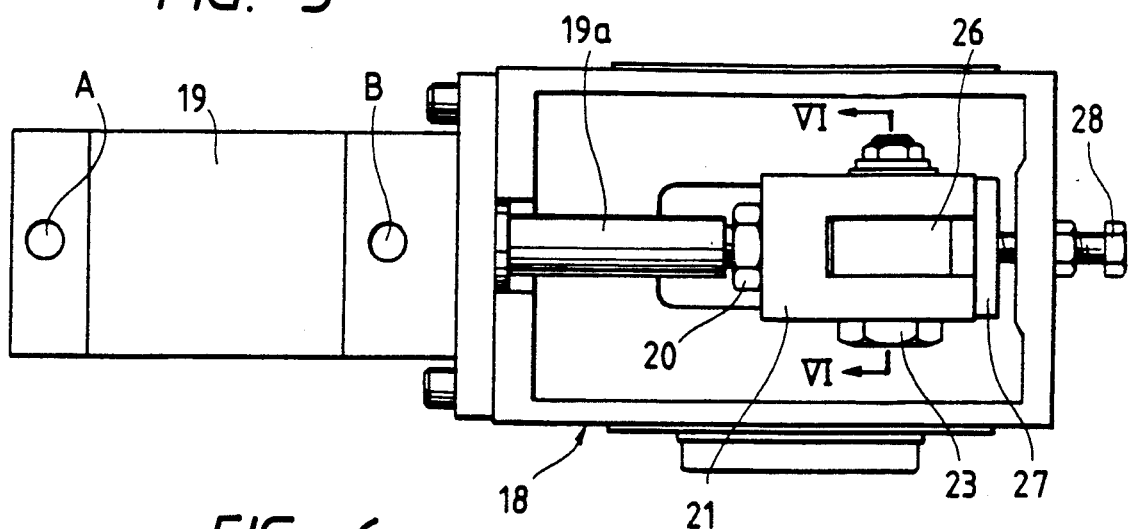
FIG. 5 is a cross sectional view taken along line V—V of FIG. 4.
Figure 6:
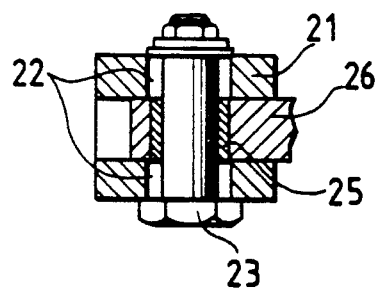
FIG. 6 is a cross sectional view taken along line VI—VI of FIG. 5.

In this embodiment, a housing 18 is fixedly secured to the lower part of the shearing mechanism 13 through an attachment plate 17 as shown in FIG. 3. As shown in FIG. 4, an air cylinder 19 is fixed to the housing 18. The air cylinder 19 has a piston rod 19a whose tip end is threaded with a clevis 21 in cooperation with a lock nut 20. The clevis 21 is in the form of a U as shown in FIG. 5 and has oblong holes 22 through which a pin 23 passes. A connecting arm 26 is connected to the clevis 21 by the pin 23 through a bearing 25. The clevis 21 has a tip end to which a plate 27 is fixed. A stopper 28 attached to the housing 18 is allowed to freely contact the plate 27. As shown in FIG. 4, the connecting arm 26 extends in a horizontal direction in the housing 18 and has a tip end to which a shaft 29 is fixed. The shaft 29 is rotatably supported by the housing 18 through bearings 30 and 31. A guide arm 33 has a base end which is fixed to the shaft 29 by clamping bolts 32 (see FIG. 4).

Figure 7:
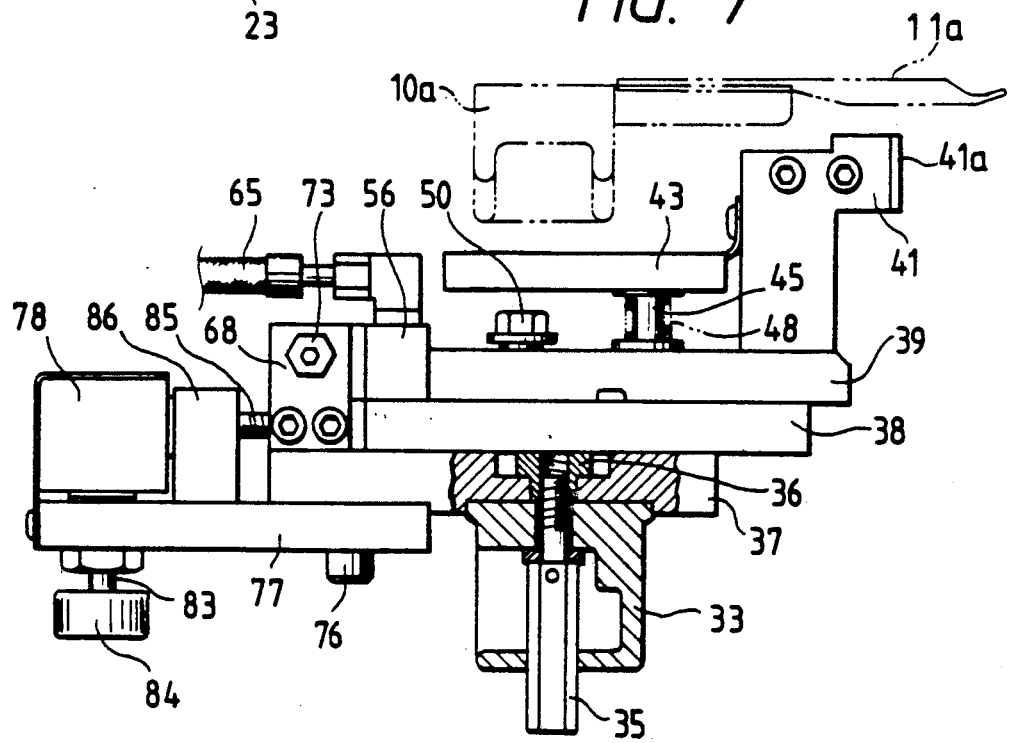
FIG. 7 is a cross sectional view taken along line VII—VII of FIG. 2.

A guide post 34 is vertically provided at the intermediate portion of the guide arm 33. The guide post 34 is always positioned inside the supporting arms 10a, 10b (see FIGS. 2 and 3) during operation of the glass gob cutting device. The guide arm 33 has a free end to which a lower plate 37 is fixed by a clamping bolt 35 and a clamping nut 36 as shown in FIG. 7. A middle plate 38 and an upper plate 39 are attached to the lower plate 37. A drop guide 41 is fixed to the upper plate 39 by bolts 40. The drop guide 41 has the function of guiding a gob of molten glass which has been cut by the shearing blades 11a, 11b and introducing the same into the glass forming machine. The drop guide 41 has a concave surface 41a constituting a guide surface for a gob of molten glass. There are provided three lines of drop guides 41 corresponding to the number of the shearing blades 11a, 11b.

A cover 43 is fixed to the drop guide 41. A screw shaft 45 is provided between the middle plate 38 and the upper plate 39. A coil spring 48 is provided on the shaft portion of the screw shaft 45 through washers 46. The coil spring 48 urges the upper plate 39 against the middle plate 38. A screw shaft 50 is provided between the lower plate 37 and the middle plate 38. A coil spring 53 is provided on the shaft portion of the screw shaft 50 through washers 51. The coil spring 53 urges the middle plate 38 against the lower plate 37.

The upper plate 39 has an end portion to which a block 56 is fixed by a bolt 55. The block 56 is provided with a water inlet port 57 and a water drain port 58. The water inlet port 57 and the water drain port 58 are connected to water passages 60, 61, respectively which are formed inside the upper plate 39. The water passages 60, 61 are connected to water passages 62, 63, respectively which are formed inside the drop guide 41. The water passages 62 and 63 are connected with each other at the tip end of the drop guide 41. The water passages 60, 61, 62, 63 jointly constitute means for cooling the drop guide 41.

With the above structure, water supplied to the water inlet port 57 passes through the water passages 60, 62, 63, 61 to cool the drop guide 41, and then reaches the water drain port 58 where the water is discharged. That is, the water cools the drop guide 41, and then returns to the drain port 58, thereby controlling temperature increase of the drop guide 41 during operation of the glass gob cutting device. Since the drop guide 41 is always in contact with molten glass of more than 1100° C., the temperature of the drop guide 41 will rise. If the temperature of the drop guide 41 becomes excessively high, molten glass will adhere to the drop guide 41 and the gob of molten glass will not be exactly led to the glass forming machine (not shown) by the drop guide 41. There is a possibility that the drop guide 41 may be deformed or melted due to molten glass of high temperature. However, as mentioned above, water cooling of the drop guide 41 completely eliminates the above disadvantages such as deformation or melting of the drop guide 41, and the gob of molten glass can be steadily supplied to the glass forming machine.

Figure 10:
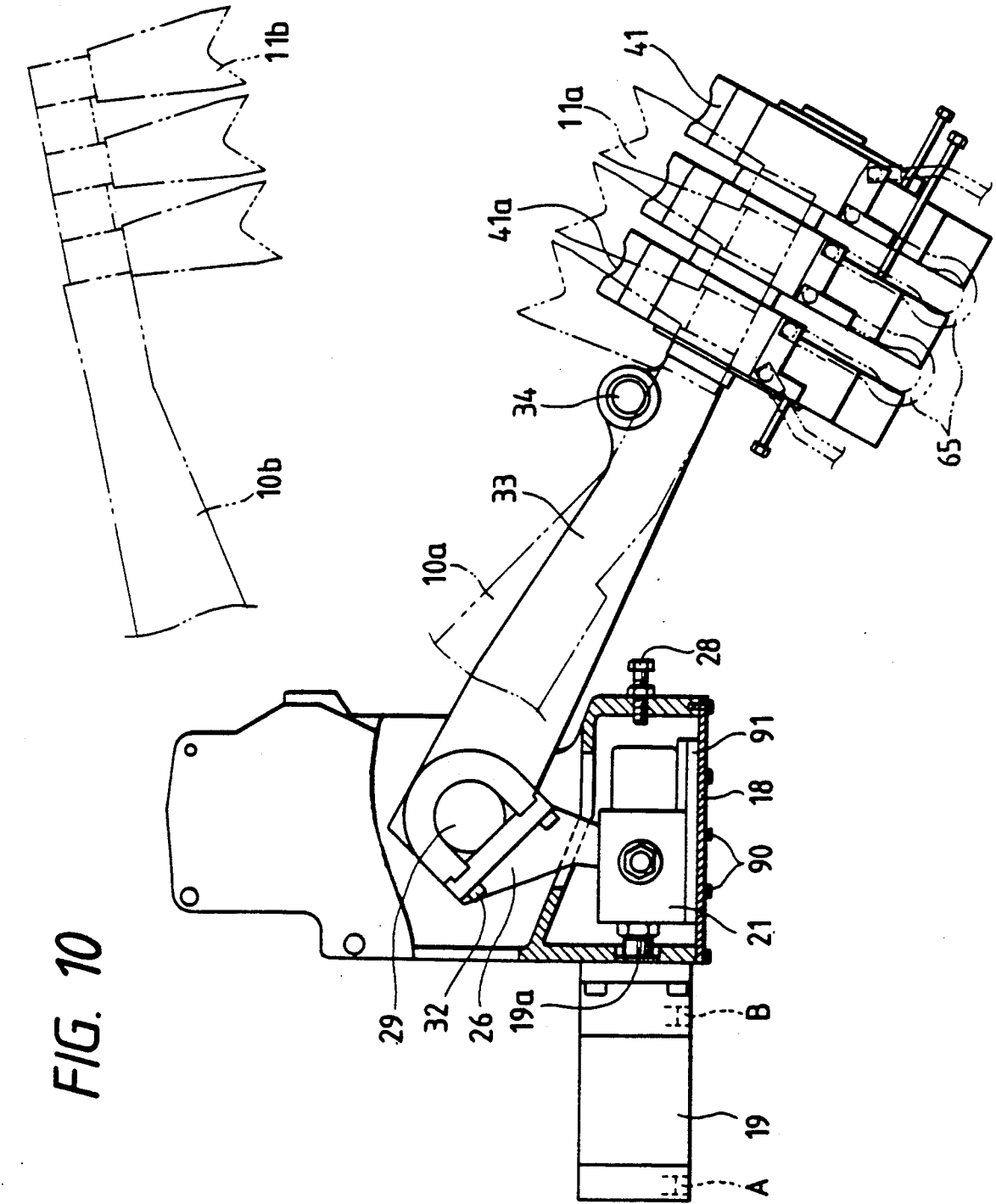
FIG. 10 is a plan view of the glass cutting device in a gob feeder according to the embodiment of the present invention.

In the case when a plurality of gob supplying lines are provided and a plurality of drop guides 41 are provided as in this embodiment, it is preferable that the water inlet 57 and the water drain port 58 of the drop guides 41 adjacent to each other are connected to each other by a flexible tube 65 made of stainless steel to circulate water through a plurality of drop guides 41 as shown in FIG. 10. Further, with respect to the cooling effect, it is preferable for the drop guide 41 to be made of a metal having a high coefficient of heat transfer such as copper or aluminum alloy.

Figure 8:
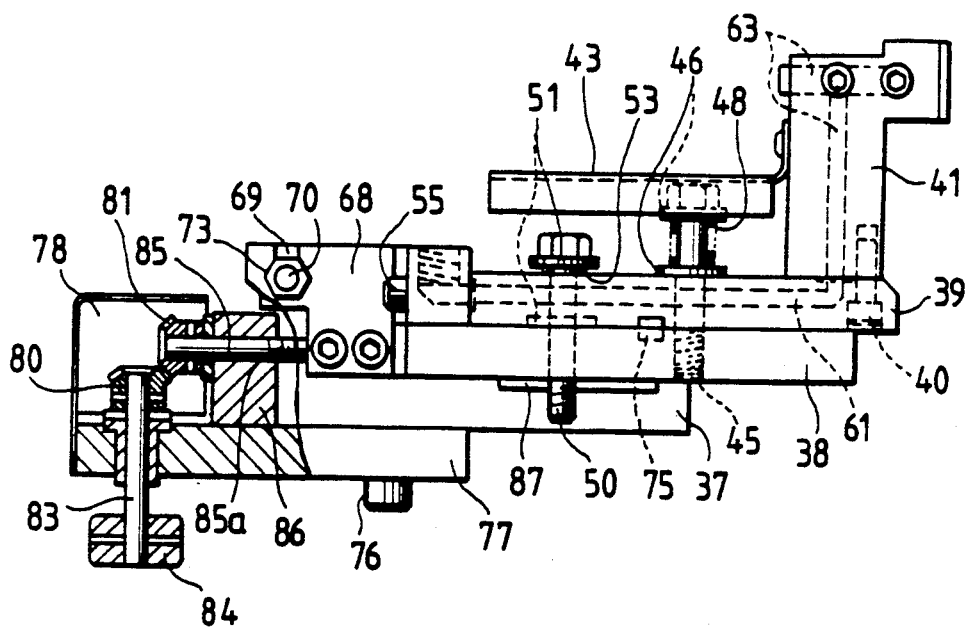
FIG. 8 is a side view of the glass cutting device in a gob feeder according to the embodiment of the present invention.
Figure 9:
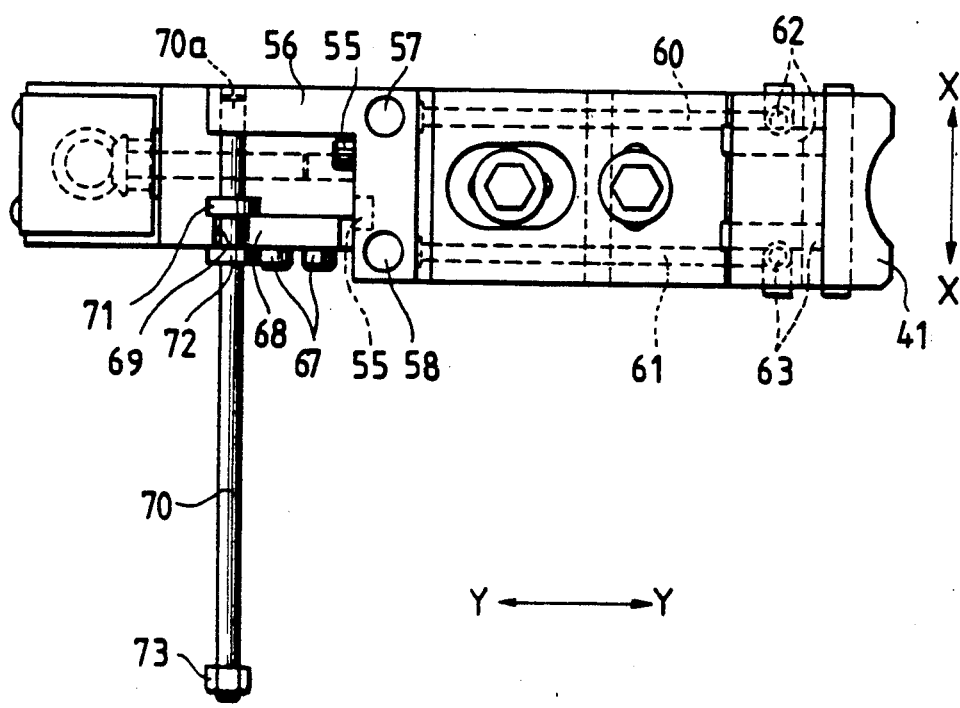
FIG. 9 is a plan view of the glass cutting device in a gob feeder in FIG. 8.

A bracket 68 is fixed to the side of the middle plate 38 by bolts 67 as shown in FIG. 8 and 9. The bracket 68 is formed with a U shaped groove 69, at an upper portion thereof, into which an adjusting rod 70 is inserted as shown in FIG. 9. The adjusting rod 70 has, at a forward portion thereof, a male screw 70a which is engaged with a female screw formed on the side wall of the block 56. A pair of collars 71, 72 are fixed to the adjusting rod 70. The adjusting rod 70 is held in the groove 69 by the pair of collars 71, 72. The adjusting rod 70 has a rear end to which a knob 73 is fixed. When gripping the knob 73 and rotating the adjusting rod 70, the bracket 68 and the block 56 are brought in contact with or apart from each other. The upper plate 39 moves relative to the middle plate 38 in a X—X direction. A key 75 is interposed between the upper plate 39 and the middle plate 38 to guide relative movement of the upper plate 39 and the middle plate 38 in a X—X direction.

A plate 77 is attached to the lower plate 37 by bolts 76 as shown in FIGS. 7 and 8. A gear box 78 is mounted on the upper portion of the plate 77. A gear 80 and a pinion 81 are disposed in the gear box 78. The gear 80 is fixed to a gear shaft 83 to which an adjusting knob 84 is fixed. The pinion 81 is fixed to a pinion shaft 85 which is supported by a bracket 86 vertically provided on the plate 77. The pinion shaft 85 has a male screw 85a which is engaged with a female screw of the middle palte 38. When rotating the adjusting knob 84, the pinion shaft 85 rotates through the gear 80 and the pinion 81. The middle plate 38 engaged with the pinion shaft 85 reciprocates relative to the lower plate 37, and the middle plate 38 and the upper plate 39 integrally moves relative to the lower plate 37 in a Y—Y direction. A key 87 is interposed between the middle plate 38 and the lower plate 37 to guide relative movement of the middle plate 38 and the lower plate 37 in a Y—Y direction.

With the above structure, when rotating the adjusting rod 70 or the adjusting knob 84, the upper plate 39 can be easily moved in a X—X direction or Y—Y direction. Therefore, the position of the drop guide 41 can be easily and finely adjusted.

Next, operation of the glass gob cutting device in a gob feeder thus constructed will be described below.

A gob of molten glass is extruded by the plunger 3 and passes through the orifice 2, and then the gob of molten glass is cut by the pair of shearing blades 11a, 11b supported by the pair of supporting arms 10a, 10b. When cutting the gob of molten glass, the pair of shearing blades 11a, 11b are actuated by the shearing mechanism 13 connected to the crank driving mechanism 7 so as to move to and from each other. Thereafter, the cut gob of molten glass is guided by the concave surface 41a of the drop guide 41 supported by the guide arm 33 and introduced into the forming machine (not shown).

In this embodiment, the guide arm 33 is not interlinked with actuation of the supporting arms 10a, 10b. When the supporting arms 10a, 10b are actuated by the shearing mechanism 13, the guide arm 33 is in a stationary position. When the guide arm 33 stops, air is being supplied to the port A of the air cylinder 19, and the piston rod 19a extends and the plate 27 attached to the clevis 21 fixed to the tip end of the piston rod 19a is in contact with the stopper 28. With this structure, the position of the clevis 21 is fixed, and the position of the connecting arm 26 is fixed, consequently the position of the guide arm 33 is fixed.

On the other hand, when replacing the orifice 2 (FIG. 1) of the forehearth 1 with another member, in order to facilitate the replacing work the guide arm 33 is swung so that the guide arm 33 can be removed from position immediately below the orifice 2 as shown in FIG. 10. Further, if a power failure occurs during operation of the glass gob cutting device, the guide arm 33 is swung in the same way mentioned above. When the guide arm 33 is swung, the supporting arms 10a, 10b are integrally and forcibly swung therewith through the guide post 34. At the time of a power failure, since the actuation of the supporting arms 10a, 10b stops, if a power failure occurs when the supporting arms 10a, 10b are closed, there is possibility that molten glass having high temperature of more than 1100° C. which flows from the orifice 2 piles up on the supporting arms 10a, 10b or the guide arm 33, resulting in a fire.

When swinging the guide arm 33, air is supplied to the port B of the air cylinder 19 as shown in FIG. 10. At this time, the piston rod 19a retracts to move the clevis 21 fixed thereto, while the clevis 21 is being guided by the rail 91 which is fixed to the housing 18 by the bolts 90. With the above structure, since the position of the clevis 21 moves, the connecting arm 26 rotates about the shaft 29 and thus the guide arm 33 rotates about the shaft 29, thereby removing the guide arm 33 from position immediately below the orifice 2.

Figure 11:
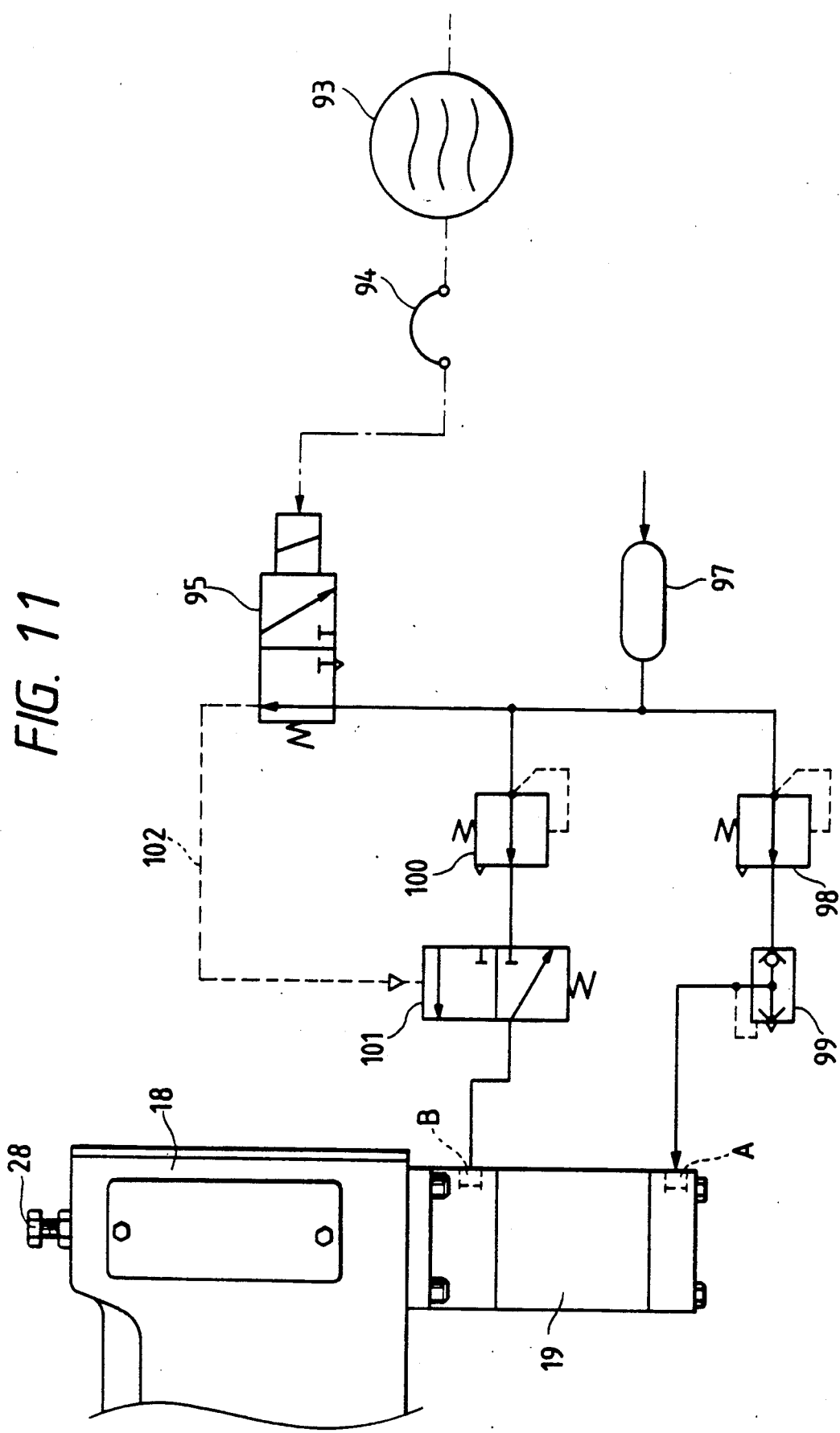
FIG. 11 is a schematic block diagram showing a piping system of the glass cutting device in a gob feeder according to the embodiment of the present invention.

FIG. 11 shows a piping system of the air cylinder 19. In the piping system, there is provided a power source 93 to which a solenoid valve 95 is connected through a switch 94. A port A of the air cylinder 19 is connected to an air supply source 97 through an air regulator 98 and a quick exhaust valve 99, in parallel with this arrangement, a port B of the air cylinder 19 is connected to the air supply source 97 through an air regulator 100 and a three way valve 101. The setting pressure of the reducing valve 100 is higher than that of the reducing valve 98. The solenoid valve 95 is connected to the air supply source 97. The three way valve 101 is connected to the solenoid valve 95 through a pilot line 102.

Next, operation of the piping system will be described below.

Normally, air in the air supply source 97 is supplied to the port A of the air cylinder 19 through the air regulator 98 and quick exhaust valve 99. The guide arm 33 is fixed to the position as shown in FIG. 4. In this case, air in the air supply source 97 reaches the three way valve 101 through the air regulator 100, but air is not supplied to the port B of the air cylinder 19 because the three way valve 101 is closed. On the other hand, when replacing the orifice 2 (see FIG. 1) with another member, the switch 94 of the power source 93 is turned off. In this case, the solenoid valve 95 is changed over, air is supplied to the three way valve 101 through the pilot line 102, and the three way valve 101 is switched so that air of the air supply source 97 is supplied to the port B of the air cylinder 19. As a result, the guide arm 33 is swung and thereafter it is fixed in the state as shown in FIG. 10.

Figure 12:
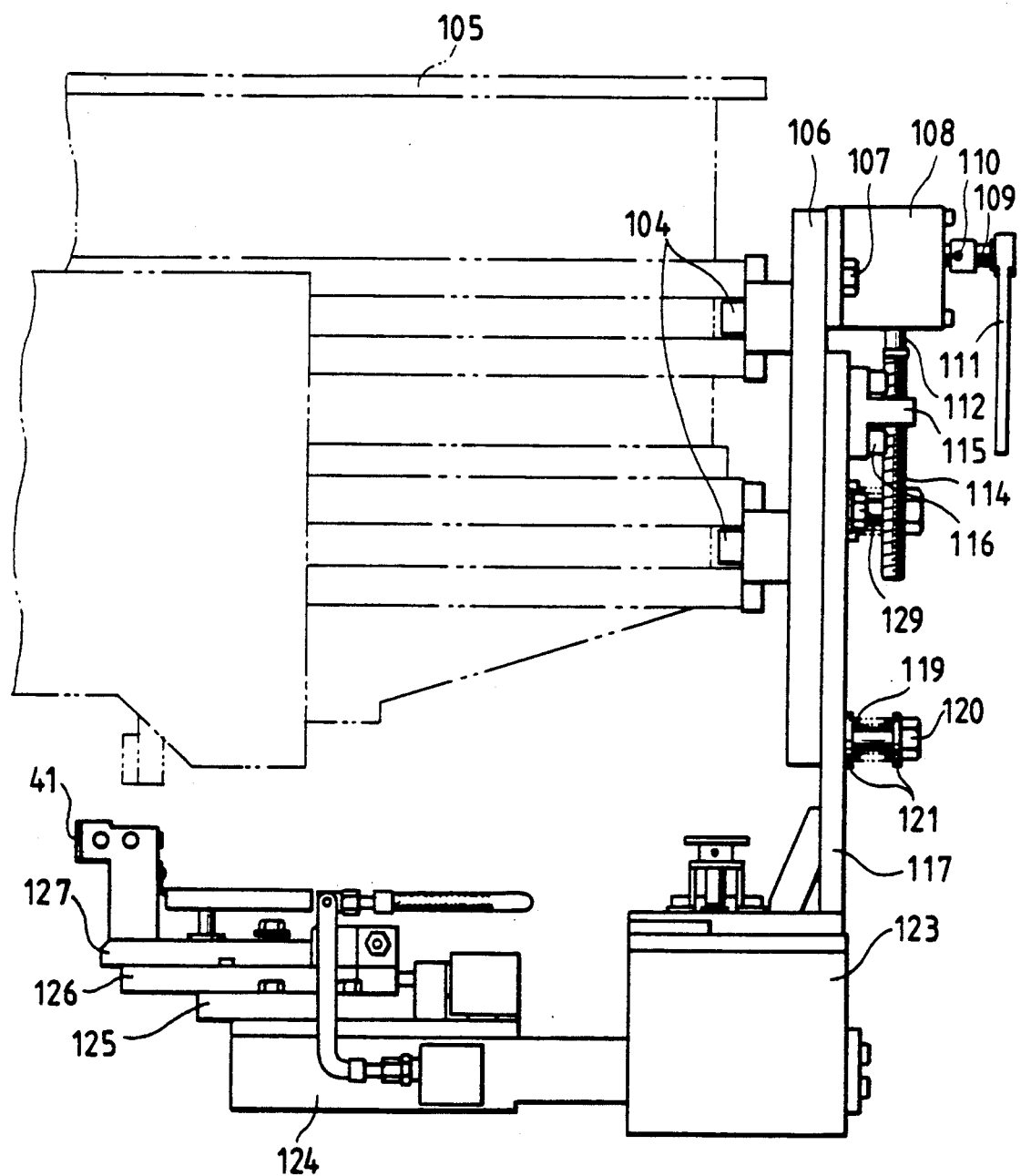
FIG. 12 is a side view of the glass cutting device in a gob feeder according to another embodiment of the present invention.
Figure 13:
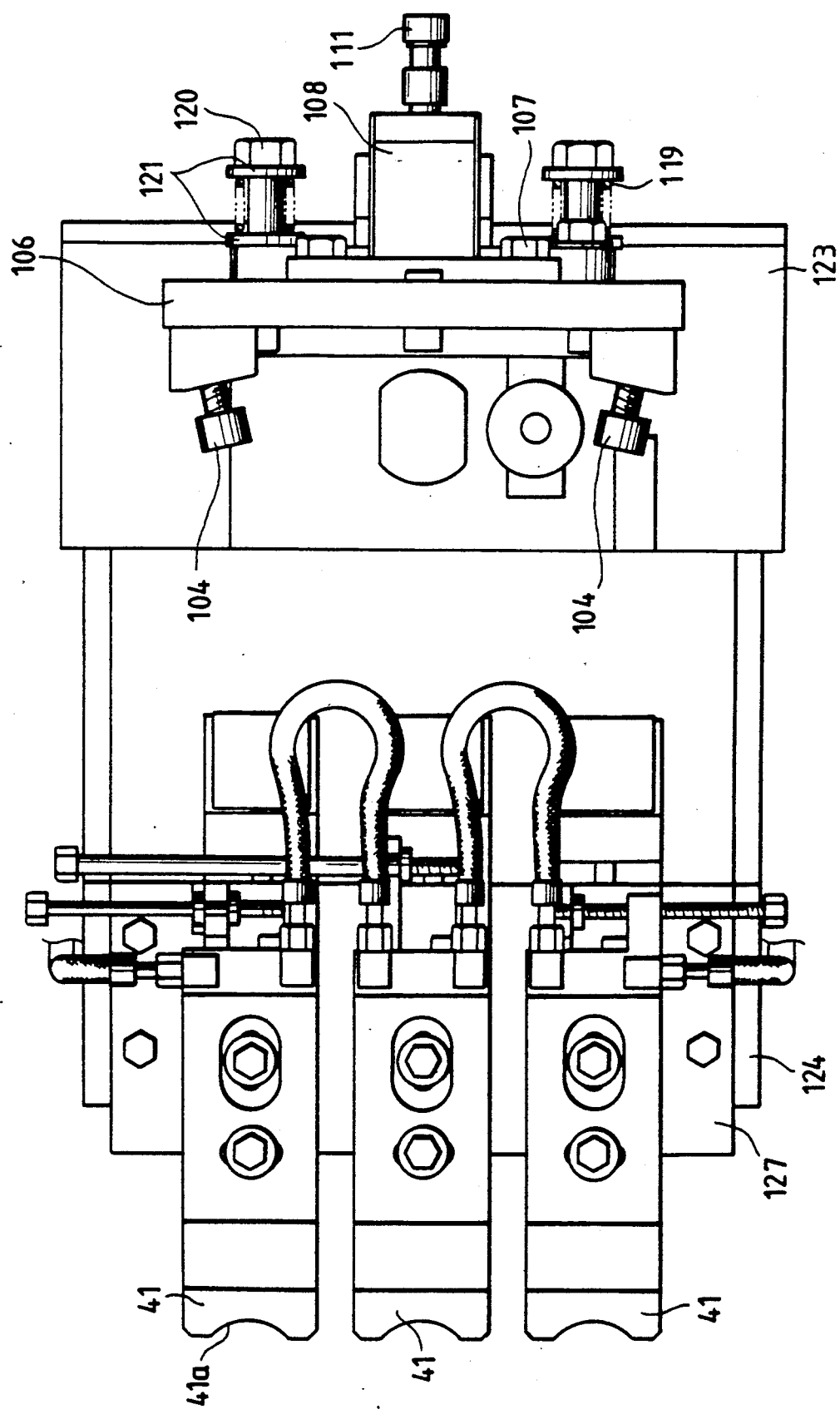
FIG. 13 is a plan view of the glass cutting device in a gob feeder according to another embodiment of the present invention.

A glass gob cutting device in a gob feeder according to second embodiment of the present invention will be described below with reference to FIGS. 12 and 13.

In this embodiment, the mechanism for supporting the guide is attached to a spout case 105 constituting the forward portion of the gob feeder by four T bolts 104. The T bolts 104 are fixed to a base 106 to which a gear box 108 is fixed by bolts 107. In the gear box 108, a gear and a pinion are incorporated (not shown), and two shafts 109, 112 connected to the gear and the pinion respectively project from the gear box 108. A socket wrench 111 is fixed to the shaft 109, an adjusting screw 114 is connected to the block 115. The adjusting screw 114 is engaged with a female screw formed in the block 115. The block 115 is fixed to a L shaped bracket 117 by bolts 116. The L shaped bracket 117 is pressed against the base 106 by urging force of a spring 119. The spring 119 is provided between washers 121, 121 which are provided on a headed bolt 120 which connects the base 106 and the bracket 117.

A guide arm 124 is fixed to the lower end of the L shaped bracket 117 through a housing 123. A lower plate 125, a middle plate 126 and an upper plate 127 are attached to the tip end of the guide arm 124. A drop guide 41 is provided at a tip end of the upper plate 127 to guide a gob of molten glass to the glass forming machine.

In the above embodiment, since the guide arm 33 is attached to the shearing mechanism 13, even if the shearing mechanism 13 is positionally changed relative to the orifice 2, the relative position of the shearing blades 11a, 11b and the drop guide 41 are not changed. Therefore, if the relative position of the shearing blades 11a, 11b and the drop guide 41 are fixed in advance, even if the shearing mechanism 13 is positionally changed relative to the orifice 2, a gob of molten glass can be reliably supplied to the glass forming machine.

In this embodiment, since the drop guide 41 is attached independently of the shearing mechanism 13, when the shearing mechanism 13 is positionally changed relative to the orifice 2, the relative position of the shearing blades 11a, 11b and the drop guide 41 is changed. In this case, according to this embodiment, the socket wrench 111 is rotated and the adjusting screw 114 is rotated through the gears in the gear box 108, thereby vertically moving the block 115 threaded with the adjusting screw 114 and integrally moving the L shaped bracket 117. With this operation, the lower plate 125, the middle plate 126 and the upper plate 127 attached to the tip end of the guide arm 124 are integrally moved up and down, thereby integrally moving the drop guide 41 up and down. Consequently, the relative position of the shearing blades 11a, 11b and the drop guide 41 are finely adjusted. However, this adjustment is not performed continuously, it is preferable to fix the base 106 to the bracket 117 by fastening the bolts 129. This fixing prevents the drop guide 41 from displacing due to vibration during operation of the glass forming machine.

In this embodiment, since the support mechanism of the guide is completely separated from the driving mechanism of the shearing blade, the moment of inertia is greatly decreased during operation of the shearing mechanism, thereby decreasing the time and labor cost required to maintain the shearing mechanism and other driving mechanism.

Further, since the chance of fine displacement of the guide are decreased, molten glass is stably supplied to the glass forming machine and thus manufacturing loss of glass articles is greatly decreased. Therefore, quality of product is highly improved and a ratio of glass product to molten glass is also highly improved.

According to the present invention, there is provided the guide arm which is actuated independently of actuation of the shearing mechanism, and the guide is provided on a free end of the guide arm to guide the cut gob of molten glass. Therefore, when the supporting arm is actuated, the guide arm is not actuated in conjunction with actuation of the supporting arm. Accordingly, even if actuating speed of the supporting arm is high, a gob of the molten glass is reliably supplied to the glass forming machine.

Although certain preferred embodiments have been shown and described, it should be understood that many changes and modifications may be made therein without departing from the scope of the appended claims.

What is claimed is:

1. A glass gob cutting device in a gob feeder for cutting a gob of molten glass supplied from an outlet defining an orifice of a forehearth and supplying the cut gob of molten glass to a glass forming machine, the glass gob cutting device comprising:
   a pair of shearing blades for cutting a gob of molten glass to make said cut gob of molten glass;
   a pair of supporting arms for supporting said pair of shearing blades;
   a shearing mechanism for actuating said pair of supporting arms, said shearing mechanism being connected to one end portion of each supporting arm;
   a guide arm extending parallel to said pair of supporting arms, said guide arm having a first end pivotally fixed about a shaft located adjacent to said shearing mechanism, said guide arm being actuated by actuating means different from said shearing mechanism; and
   guide means, provided on a free end of said guide arm, for guiding said cut gob of molten glass and introducing the same into said glass forming machine.

2. The glass gob cutting device in a gob feeder as recited in claim 1, wherein said guide arm is provided at an end of said shearing mechanism.

3. The glass gob cutting device in a gob feeder as recited in claim 1, wherein said guide arm is connected to a spout case constituting a forward end of said forehearth.

4. The glass gob cutting device in a gob feeder as recited in claim 1, wherein said guide means is provided with a cooling mechanism for cooling itself.

5. The glass gob cutting device in a gob feeder as recited in claim 4, wherein said cooling mechanism comprises water passages formed inside of said guide means.

6. The glass gob cutting device in a gob feeder as recited in claim 1, further comprising adjusting means for adjusting guide position of said guide means, and wherein said guide means is horizontally movable relative to said guide arm.

7. The glass gob cutting device in a gob feeder as recited in claim 1, further comprising adjusting means, said adjusting means are interposed between said guide arm and said guide means, said adjusting means comprises a first member, a second member being movable relative to said first member in a first direction and a third member being movable relative to said second member in a second direction perpendicular to said first direction.

8. The glass gob cutting device in a gob feeder as recited in claim 1, wherein said actuating means further comprises means for moving said guide arm so that said guide arm can be brought apart from said outlet of said furnace when actuating said actuating means.

9. The glass gob cutting device in a gob feeder as recited in claim 8, wherein said shearing mechanism further comprises means for moving said supporting arms together to integrally join said supporting arms with said guide arm.

* * * * *